United States Patent [19]

Kuhn

[11] 3,890,394

[45] June 17, 1975

[54] PROCESS FOR MAKING ALPHA-CHLORO SULFIDES

[75] Inventor: Stephen J. Kuhn, Sarnia, Ontario, Canada

[73] Assignee: The Dow Chemical Company, Midland, Mich.

[22] Filed: Apr. 28, 1972

[21] Appl. No.: 248,666

[52] U.S. Cl.... 260/609 R; 260/488 F; 260/488 CD; 260/609 E
[51] Int. Cl................. C07c 149/10; C07c 149/30; C07c 69/04
[58] Field of Search ............. 260/496, 609 R, 609 E

[56] References Cited
OTHER PUBLICATIONS
Taylor, Advances in Organic Chemistry, Vol. 6, pgs. 343–345.

*Primary Examiner*—Lewis Gotts
*Assistant Examiner*—D. R. Phillips
*Attorney, Agent, or Firm*—Chessie E. Rehberg

[57] ABSTRACT

α-Chloro sulfides are made by the reaction of dichloromethyl ethers with the appropriate sulfoxide. The reaction is illustrated as follows:

$CHCl_2OCH_3 + CH_3S(O)CH_3 \rightarrow CH_2ClSCH_3 + HCOOCH_3 + HCl$

The sulfoxide used must have at least one α-H. The dichloromethyl ether is preferably one of low molecular weight and such that the formate ester derived from it has a boiling point substantially different from that of the α-chloro sulfide.

The reaction proceeds conveniently at 0°–100°C. and produces high yields in a short time.

10 Claims, No Drawings

PROCESS FOR MAKING ALPHA-CHLORO SULFIDES

BACKGROUND OF THE INVENTION

α-Chloro sulfides are a well known family of compounds having various uses. They have heretofore been made by chlorinating the sulfide with sulfuryl chloride or by the reaction of the corresponding sulfoxides with thionyl chloride [see, for example, Bordwell and Pitt, J. Am. Chem. Soc., 77, 572 (1955)].

The dichloromethyl ethers used as reactants in the present invention are also well known and can be conveniently made by the reaction of $PCl_5$ on the corresponding formate ester by the method of Gross et al., Org. Syn., 47, 47 (1967):

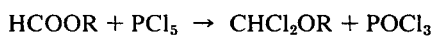

$$HCOOR + PCl_5 \rightarrow CHCl_2OR + POCl_3$$

Since the formate ester is regenerated in the process, it can be recycled indefinitely.

SUMMARY OF THE INVENTION

According to the invention, α-chloro sulfides are made by the reaction of the appropriate sulfoxide with a dichloromethyl ether. The sulfoxide, of course, must have at least one α-H. The reaction can be illustrated as follows:

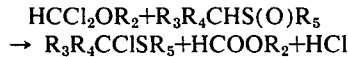

$$HCCl_2OR_2 + R_3R_4CHS(O)R_5$$
$$\rightarrow R_3R_4CClSR_5 + HCOOR_2 + HCl$$

wherein $R_2$ and $R_5$ are each an organic group that is inert in the process and $R_3$ and $R_4$ are each H or an organic group that is inert in the process. The preferred inert organic groups are hydrocarbon, particularly alkyl, aralkyl or aryl.

The reaction is suitably conducted under mild conditions, such as about 0°–100°C. for a time of a few minutes to a few hours, and preferably in an inert solvent. Suitable solvents include aliphatic and aromatic hydrocarbons and halohydrocarbons, the liquid chlorinated methanes and ethanes, and the like.

DETAILED DESCRIPTION OF THE INVENTION

In carrying out the process of the invention, the reactants are contacted, preferably in an inert solvent, at a mild temperature, preferably about 25°–50°C., until substantial reaction has occurred. The desired product is then separated from the reaction mixture by any suitable means, preferably by distillation except high-boiling or heat-sensitive products which may be more satisfactorily separated by crystallization, solvent extraction, or other conventional means.

If separation of the product by distillation is desired, the dichloromethyl ether should be chosen such that the by-product ester derived therefrom has a boiling point substantially different from the boiling point of the sulfide product.

The ratio of reactants is not critical, though best results are obtained with substantially equivalent amounts of the reactants.

In those instances where the sulfoxide has at least one hydrogen atom on each α-carbon atom, some of each of the two possible α-chloro sulfides may be formed, though in general the chlorine goes predominantly to the α-carbon atom bearing fewest hydrogen atoms.

The practice of the invention is illustrated by the following examples.

EXAMPLE 1

Chloromethyl Methyl Sulfide

One-half mole each of dimethyl sulfoxide and dichloromethyl methyl ether were dissolved in 250 ml. of chloroform at room temperature. A mildly exothermic reaction occurred. After 10 minutes, the mixture was heated to boiling and refluxed 15 minutes. The solvent and the by-product methyl formate were then distilled at atmospheric pressure, leaving the crude product in substantially quantitative yield. This product was then distilled under reduced pressure to produce the purified product in 97% yield.

EXAMPLE 2

α-Chlorobenzyl Methyl Sulfide

One-quarter mole each of benzyl methyl sulfoxide and dichloromethyl n-butyl ether were dissolved in 199 ml. of chloroform and the mixture was refluxed 30 minutes. The solvent was distilled at atmospheric pressure, after which the by-product n-butyl formate and the desired product were distilled under reduced pressure. The product distilled at 109°–110°C. (0.8 mm.). Yield, 96%.

EXAMPLE 3

Chloromethyl Phenyl Sulfide

By essentially the procedure of the previous examples, methyl phenyl sulfoxide was reacted with dichloromethyl β-chloroethyl ether. B.P., 93°C. (6 mm.). Yield, 93%.

The following table shows other similar α-chloro sulfides that are produced by the reaction of the sulfoxide with an α,α-dichloroalkyl ether. In the table, the reactants and products are defined by the radicals $R_{2-5}$ as set forth in the equation above.

TABLE I

| $R_2$ | $R_3$ | $R_4$ | $R_5$ |
|---|---|---|---|
| $CH_3$ | H | $CH_3$ | $CH_3$ |
| $CH(CH_3)_2$ | H | $(CH_2)_4CH_3$ | $C_6H_5$ |
| $C_6H_5$ | $C_6H_5$ | $C_6H_5$ | $C_6H_5CH_2$ |
| $C_6H_5CH_2$ | $CH_3$ | $C_6H_5$ | $C_2H_5$ |
| $(CH_2)_5CH_3$ | $C_6H_5CH_2$ | $C_2H_5$ | $(CH_2)_7CH_3$ |
| $CH_3$ | $C_4H_9$ | H | $CH_3$ |
| $C_3H_7$ | $C_8H_{17}$ | $CH_3$ | $CH_3$ |

I claim:

1. The process of making an α-chloro sulfide comprising reacting by contacting the corresponding sulfoxide with a dichloromethyl ether.

2. The process of claim 1 wherein the reaction is conducted at about 0°–100°C.

3. The process of claim 2 wherein the temperature is about 25°–50°C.

4. The process of claim 1 wherein the ether has the formula $HCCl_2OR_2$, wherein $R_2$ is an organic group that is inert in the process.

5. The process of claim 1 wherein the sulfide has the formula $R_3R_4CClSR_5$, wherein $R_3$ and $R_4$ are H or organic groups inert in the process and $R_5$ is an organic group inert in the process.

6. The process of claim 5 wherein $R_3$ and $R_4$ are H and $R_5$ is alkyl.

7. The process of claim 6 wherein $R_5$ is $CH_3$.

8. The process of claim 6 wherein the ether is a dichloromethyl alkyl ether.

9. The process of claim 7 wherein the ether is dichloromethyl methyl ether.

10. The process of claim 9 wherein the α-chlorosulfide and the dichloromethyl ether are used in substantially equimolar amounts and the reaction is conducted at a temperature of about 0°–100°C.

* * * * *